Nov. 27, 1956  J. VON RANSON  2,771,781
ROTARY SEAL
Filed July 18, 1955  2 Sheets-Sheet 1
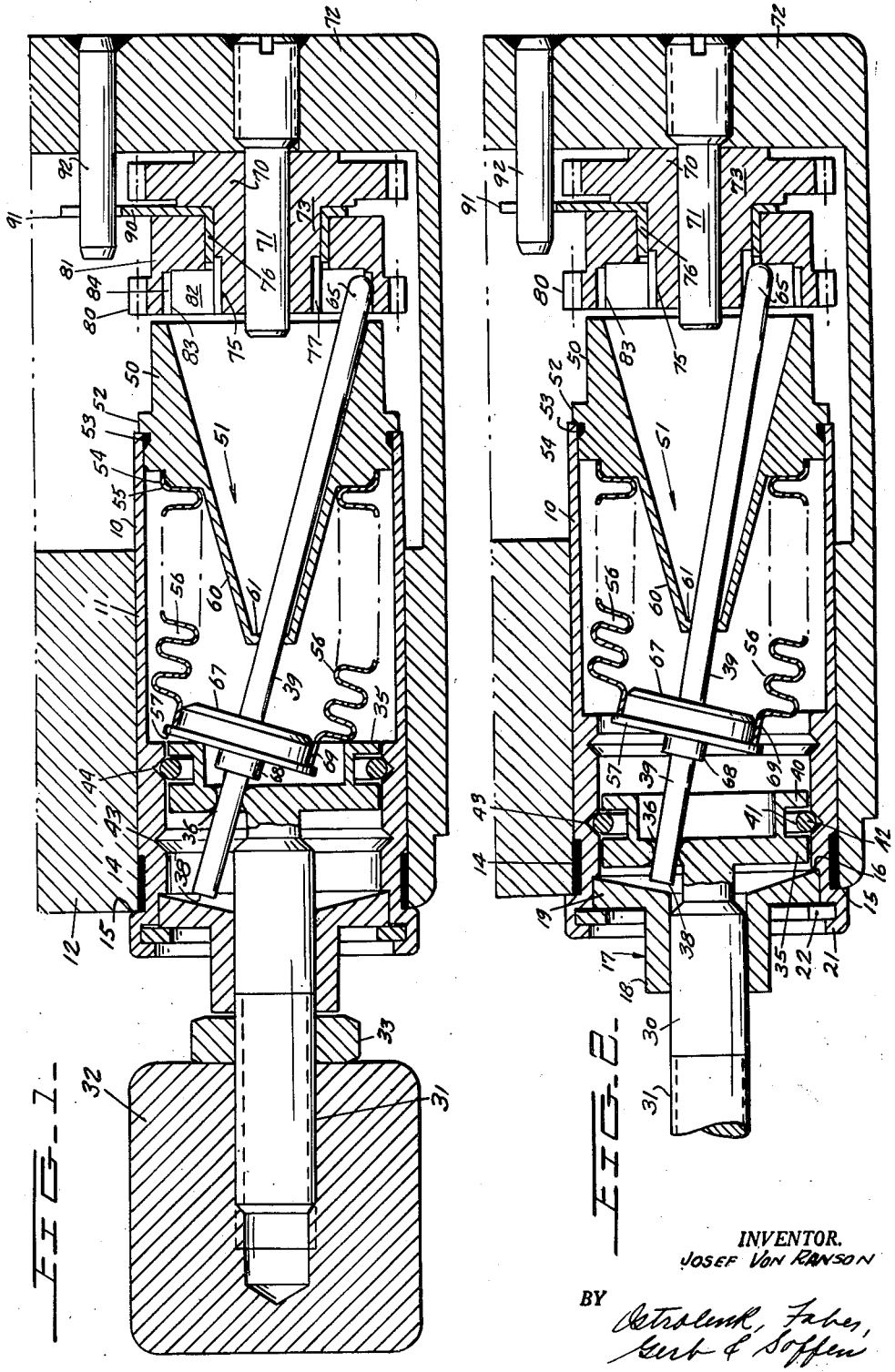
INVENTOR.
JOSEF VON RANSON
BY
Ostrolenk, Faber,
Gerb & Soffen
ATTORNEYS Nov. 27, 1956  J. VON RANSON  2,771,781
ROTARY SEAL
Filed July 18, 1955  2 Sheets-Sheet 2
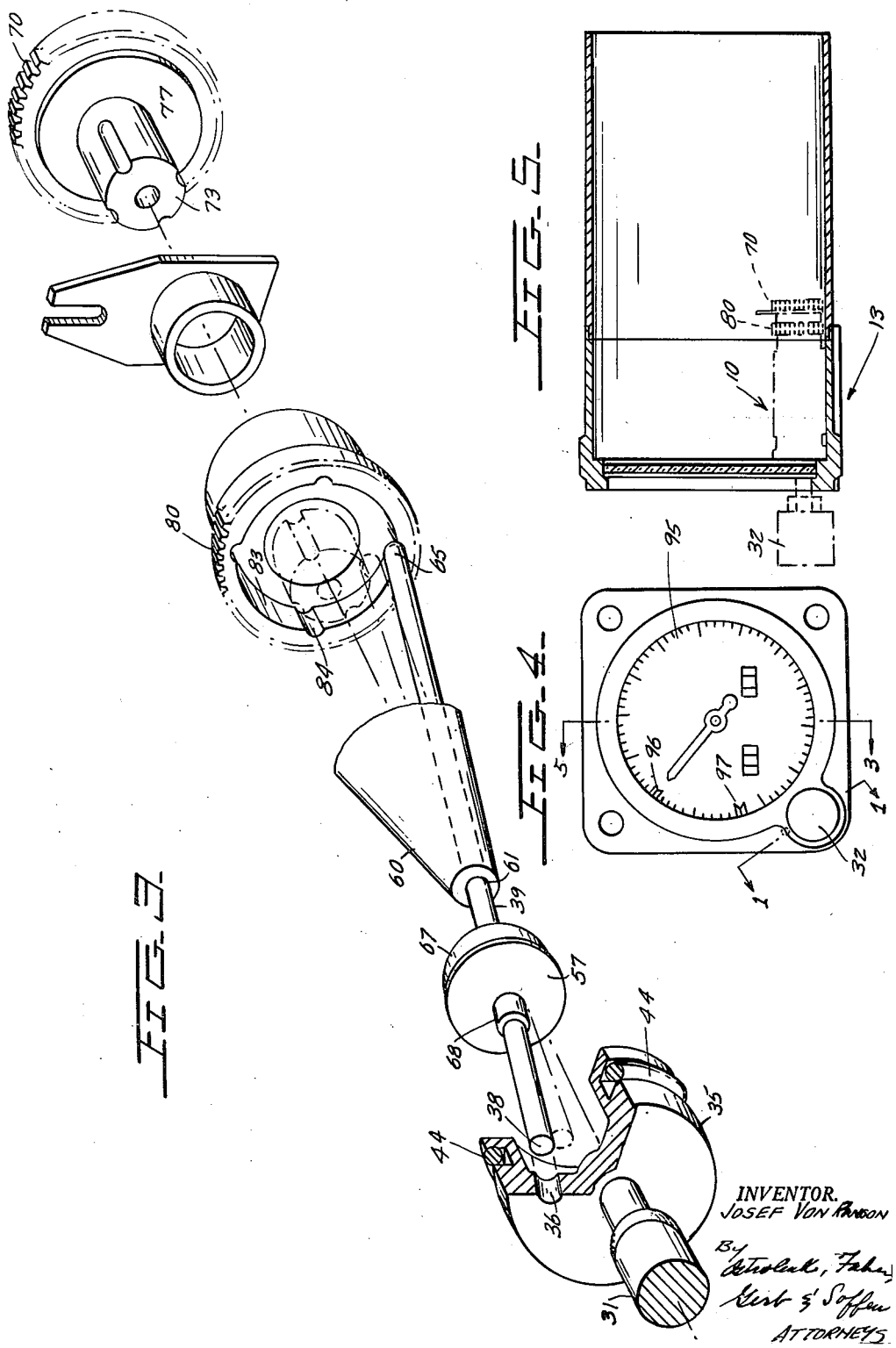
INVENTOR.
JOSEF VON RANSON

United States Patent Office 2,771,781
Patented Nov. 27, 1956

2,771,781
ROTARY SEAL

Josef Von Ranson, New Milford, Conn., assignor to Kollsman Instrument Corporation, Elmhurst, N. Y., a corporation of New York Application July 18, 1955, Serial No. 522,700

7 Claims. (Cl. 74—18.1)

My present invention is related to operating mechanism for adjusting an instrument and more particularly to operating mechanism which may be manually controlled from the exterior of the instrument and will adjust and operate elements within a completely sealed instrument while the seal is fully maintained at the point where the operating mechanism passes through the instrument casing.

In the construction and operation of various instruments, particularly those used in aircraft, it is extremely important in connection with many of the instruments in order to maintain accuracy of indication that the instruments be completely sealed, particularly with respect to moisture, to prevent corrosion of the delicate instruments within the instrument casing and to ensure that no variations in readings or operation of the instruments will occur because of the introduction of moisture into the casing.

However, it frequently becomes necessary to adjust the instrument by a manually controlled knob accessible exterior to the instrument which operates elements inside the casing, and thus it becomes necessary to provide a complete moisture-proof seal at the control knob.

While various attempts at moisture-proof seals are known for this purpose, they have not been successful thus far actually because they were not moisture-proof in a fool-proof manner or they were so bulky and complicated as to add appreciably to the expense of the instrument, or their operation was stiff and unpredictable owing to the introduction of moisture-proofing elements.

The particular object of the present invention is the provision not only of a moisture-proof seal between the manual operating knob and the operating elements within the casing in order to permit adjustment of the instrument, but also the provision of such moisture-proof means in connection with adjusting mechanisms which may be utilized and adjusted selectively to make at least two separate adjustments on two separate internal mechanisms.

My invention, therefore, contemplates that a stationary tube or casing for the moisture-proof adjustment mechanism be mounted stationarily in the housing or casing of the instrument, the stationary mounting of the tube being such as to permit complete moisture-proofing at the point where the tube passes through the housing.

One end of the tube is provided with operating mechanism terminating in a manual control knob. An adjusting rod passing through the interior of the tube is connected for operation by the manually operated control knob through intermediate mechanism. The interior of the tube is provided with a cylindrical bellows of the type of material utilized for the making of aneroid diaphragms, the said bellows being closed at its outer end.

An interior peripheral portion of the bellows is sealed to a disc on the rod. The other end of the bellows is sealed to a flange of a conical member which in turn seals the inner end of the tube. The operating rod extends through an opening in the apex of the conical member, which opening provides a fulcrum around which the rod may pivot. The manual operating member is slidably connected to the operating rod in such manner that the manual operating member when moved in will cause the rod to pivot to a substantial angle with respect to the axis of the tube and when the operating knob is pulled out, the rod will pivot to a smaller angle with respect to the axis of the tube.

The free inner end of the rod may thus be moved from engagement with one adjusting element to engagement with another adjusting element prior to rotation thereof by the manual operating knob.

A further object of the invention, therefore, is to provide a moisture-proof seal in connection with manual adjustment for operating mechanism which may be utilized to make at least two adjustments in the interior of the casing.

The foregoing and many other objects of the invention will become apparent in the following description and drawings in which:

Figure 1 is a longitudinal cross-sectional view showing my novel moisture-proof adjusting mechanism in operating position for adjustment of a selected internal element within the instrument housing. This cross-sectional view is taken on line 1—1 of Figure 4 looking in the direction of the arrows.

Figure 2 is a view corresponding to that of Figure 1 showing another selected position of the mechanism for operation of another mechanism.

Figure 3 is an expanded schematic view of the adjusting mechanism of Figures 1 and 2.

Figure 4 is a front view of an instrument casing showing one way in which the novel adjusting mechanism may be used.

Figure 5 is a cross-sectional view of the casing taken on line 5—5 of Figure 4 looking in the direction of the arrows.

Referring first to Figures 1, 2 and 3, the adjusting mechanism is completely carried by the tubular member 10, which tubular member may be secured in an opening 11 in front wall 12 of the instrument housing 13. The tubular casing 11 is at all times during the operation of the device to remain stationary. Hence, it may be sealed in the opening 11 in any suitable manner for the purpose of excluding moisture.

One means for obtaining this moisture-proof arrangement is the utilization of solder as a seal in the peripheral channel 14 of the tubular casing 10 adjacent the front of the front wall of housing 12. The front of the casing is also provided with the annular flange 15 which bears against the surface of front wall 12.

By this means, therefore, the leakage of moisture around the exterior of casing 10 into the interior of the instrument housing is avoided.

The outer end of the casing 10 is provided with the recess or rabbet 16 against which the front closure assembly 17 for the casing is sealed. The front closure assembly 17 comprises the tubular guide member 18 and the flange member 19 which seats against the rabbet. Immediately external of the flange 19 the casing 10 is provided with the annular recess 20 having the reentrantly formed annular flange 21 to provide means for securing a gasket 22 in place in order to provide a substantial seal with respect to the annular flange 19 of the closure assembly 17. While it is desirable that this particular seal at the front closure of the casing be as moisture-proof as possible, the actual positive moisture-proofing is achieved by the utilization of the bellows means hereinafter described.

The manual operating mechanism comprises the shaft 30 which is rotatably mounted in the tubular member 18 and for which the tubular member 18 acts as both a sliding and rotating bearing. The shaft 30 is threaded at 31 adjacent its outer end to provide means for mounting a knurled knob 32 thereon, which knob is held in position by the lock nut 33. The shaft 30 is connected to and integrated with the position control disc 35, the said position control disc being provided with a through opening 36 extending at an angle to the axis of shaft 30 and in a plane which includes the axis of shaft 30; and spaced radially therefrom.

The free end 38 of rod 39 extends through the opening 36. The disc 35 is provided with the flange 40 having the recess 41 in which is mounted the circular spring member 42. The circular spring member 42 cooperates with detent 43 to position the shaft 30 for rotation in its outermost translated position. The spring 42 cooperates with detent 44 as shown in Figure 1 to permit the shaft 30 to be detented in its innermost translated position.

In other words, the knob 32 may be grasped and pulled outwardly until the spring 42 clicks into detent 43, thereby positioning the knob and its associated assembly in the upward position; also knob 32 may be pushed in and the spring 42 will slide out of the detent 43 and snap into the detent 44 to releasably position the knob at its inward position. The knob 32 and the shaft 30 together with disc 35 may be rotated freely at either position.

The inner end of the casing is provided with the closure member 50 having an interior opening 51 of conical form with the open end of the cone directed toward the interior of the unit. Closure member 50 has an annular external flange 52 which bears against the inner end of tube 10 and a recess 53 adjacent the flange 52 which is interior of the tube 10. The recess 53 is filled with solder and thus provides a moisture-proof seal between the closure member 50 and the tube.

Closure member 50 is further provided with the inner circular extension 54 to which the free end 55 of the bellows 56 is soldered. The bellows 56 which may be of any suitable moisture-proof material and is preferably of the type of metal ordinarily used in the construction of aneroid diaphragms extends toward the front end of the member so that a portion at least of the end wall 57 of the bellows extends into the detent area 44, thereby providing the maximum possible length for the bellows 56 as shown by a comparison of Figure 2 with Figure 1.

The conical opening 51 in the closure 50 is further defined by the conical wall 60 extending from the closure member 50 toward the front of the unit and terminating in the fulcrum opening 61 through which the rod 39 passes.

The end wall 57 of the bellows is formed by the disc 67 having an opening and a sleeve 68 which is mounted over the rod 39 and soldered to the rod 39. The bellows itself is soldered at 69 to the disc 67. The soldered closure 53 around the inner member 50, the solder connection 55 of the bellows 56 to the inner member 50 and the solder connection of the rod 39 to the disc 67 which forms the end wall 57 of the bellows 56 provide a complete moisture-proof seal from the exterior to the interior of the instrument housing 13.

The fact that the rod 39 is rotatable within the opening 36 as the shaft 30 rotates permits the rod to be translated during rotation of the knob 32 without causing the rod 39 to spin on its own axis. Consequently, the solder connection at disc 67 and sleeve 68 with the rod 39 becomes entirely practical.

When now the knob 32 is pulled out from the position of Figure 1 to the position of Figure 2, the change in distance between the slanted opening 36 and the fulcrum 61 causes the rod 39 to pivot about the fulcrum 61 so that the rod 39 assumes a smaller angle with respect to the axis of the tubular casing 10, and the free end 65 of the rod moves from the position of Figure 1 to the position of Figure 2 toward the axis of casing 10.

When the knob 32 is pushed in from the position of Figure 2 to the position of Figure 1, then the reverse operation takes place and the free end 65 of rod 39 moves from the inner position of Figure 2 to the outer position of Figure 1.

Thus, the end 65 of rod 39 may be rotated translatorily about the pivot 61 by the knob 32 in either the inner position of Figure 2 or the outer position of Figure 1. The two different positions of end 65 of rod 39 may be utilized to operate two different mechanisms.

Thus, in Figures 1, 2 and 3 I have shown a gear 70 mounted on the stationary shaft 71 carried by a portion 72 of the inner instrument housing, the said gear 70 having a hub 73 with two annular lands 74, 75. Land 74 provides a surface for the bearing member 76 hereinafter described. Land 75 is provided with a plurality of longitudinal indentations 77 parallel to the axis of the hub 73.

When the knob 32 is pulled out to the position of Figure 2, the free end 65 of the rod 39 bears against land 75 of the hub 73 and as it passes one of the indentations 77 on rotation of the knob 32 snaps into the indentation 77 and thus rotates the gear 70. Gear 80 is provided with the hub 81 which rotates on the stationary bearing 76 which in turn is mounted over section 74 of hub 73 of gear 70. The interior of hub 81 adjacent the front end thereof is hollowed out at 82 to provide the inner land 83 which in turn has a plurality of indentations 84.

When the knob 32 is pulled out to the position of Figure 1, the end 65 of rod 39 bears against the surface 83 and on rotation of the knob 32 the end 65 of rod 39 will snap into one of the indentations 84 and cause the gear 80 to rotate. The bearing 76 is provided with the anchor member 90 having a forked end 91 which fits over the stationary stud 92 to prevent rotation of the bearing 76. In this way rotation of gear 70 will not effect rotation of gear 80 and vice versa.

The gear 70 may be connected permanently to make one adjustment of the instrument on rotation of the gear 70, and the gear 80 may be connected to make another adjustment of the instrument on rotation thereof. Thus, for instance, in Figure 4 I have shown a manifold pressure indicating device with an indicating pointer 95 showing the instantaneous pressure and two adjustable pointers 96 and 97 to show desired settings or readings for the pointer 95.

The pilot prior to take-off or at any other time may receive information as to the desired manifold pressure during take-off and may desire to move the indicating pointer 96 to the setting for this suggested pressure. The indicating pointer 96 is then connected by appropriate mechanism to the gear 80 so that the pilot may push in the knob 32 and then rotate it until the pointer 96 is set at the desired pressure. He may also receive information as to the desired pressure during cruising. He will then pull out the knob 32 and rotate it so that the gear 80 through appropriate mechanism will operate the indicating pointer 97.

Obviously this kind of adjustment may be utilized in connection with many other kinds of instruments and, in fact, with all instruments where more than one adjustment is desired, by the utilization of the same knob and where a complete moisture-proof seal is required.

It should here be noted that the bellows 56 owing to its length is distorted to the minimum possible amount between the two positions of Figures 1 and 2, and this distortion occurs owing to the slight change in angle of the operating rod 39 around its fulcrum 61. It has been found that a bellows having only five or six ribs will operate effectively and without any crystallization for this purpose.

It will be obvious that any desired length of bellows may be provided merely by lengthening the casing 10 and by moving the end wall 57 of the bellows closer to the fulcrum 61.

The size of the entire unit of Figures 1 and 2 may be understood from the fact that the external diameter of the casing 10 in a practical operating unit is of the order of 7/16" and the length of the casing 10 from flange 15 to the inner end is of the order of 7/8".

By this means, therefore, I have been able to achieve a complete moisture-proof seal in a simplified adjusting mechanism which may be utilized for multiple adjustment purposes. Various attempts of this kind have been made and as above pointed out have failed of success principally because many limiting factors were overlooked.

For instance, one of the important elements of my novel device is the provision of the adjustment of the angular position of the rod 39 while at the same time limiting the endwise movement of the rod 39.

Another and important feature is the provision of the double adjustment by the utilization of a single mechanism.

It will also be obvious that while two circles of motion transmission have here been described, the addition of a third detent between detents 43 and 44 can cause end 65 of rod 39 to assume an intermediate position between that of Figure 1 and Figure 2; and the addition of other detents may permit a number of such intermediate positions to be assumed. Thus, by the use of appropriate translating mechanism connectable at various radial positions of end 65 of rod 39, multiple adjustments are possible.

Also, by omission or non-use of the detents 43 and 44, a universal mechanism may be obtained in which the end 65 of rod 39 may be connected to an eccentrically movable member or to a large number of alternate members.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A moisture-proof sealed motion transmitting mechanism for transmitting motion to at least two radially displaced positions comprising: a casing, a closure member sealed to one end of said casing; a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft.

2. A moisture-proof sealed motion transmitting mechanism for transmitting motion to at least two radially displaced positions comprising: a casing, a closure member sealed to one end of said casing; a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft, and a sealed bellows between the interior of said closure member and the portion of said rod between the fulcrum and the operating shaft.

3. A moisture-proof sealed motion transmitting mechanism for transmitting motion to at least two radially displaced positions comprising: a casing, a closure member sealed to one end of said casing; a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft, and a sealing member between the interior of said closure member and said rod.

4. A moisture-proof sealed motion transmitting mechanism for transmitting motion to at least two radially displaced positions comprising: a casing, a closure member sealed to one end of said casing; a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft, and a sealed bellows between the interior of said closure member and the portion of said rod between the fulcrum and the operating shaft; the fulcrum being aligned with the axis of said shaft.

5. A moisture-proof sealed motion transmitting mechanism for transmitting motion to at least two radially displaced positions comprising: a casing, a closure member sealed to one end of said casing, a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft, and a sealed bellows between the interior of said closure member and the portion of said rod between the fulcrum and the operating shaft, the fulcrum comprising an opening in said closure member.

6. A moisture-proof sealed motion transmitting mechanism for transmitting motion to at least two radially displaced positions comprising: a casing, a closure member sealed to one end of said casing; a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft, and a sealed bellows between the interior of said closure member and the portion of said rod between the fulcrum and the operating shaft, the fulcrum comprising an opening in said closure member, said opening being displaced inwardly into the casing.

7. A moisture-proof sealed motion transmitting mechanism for transmitting motion to at least two radially displaced positions comprising: a casing, a closure member sealed to one end of said casing; a fulcrum within said casing; a rod mounted for universal rotation in said fulcrum; operating mechanism for said rod comprising a shaft rotatable around its axis and movable along its axis and a member carried by said shaft; means slidably interconnecting said last mentioned member and one end of said rod at a point displaced from the axis of rotation of said shaft; the free end of said rod extending beyond said closure member out of the casing; movement of said shaft toward the fulcrum causing said rod to displace the free end thereof further from an imaginary extension of the axis of said shaft; movement of said shaft away from the fulcrum causing said rod to displace the free end thereof closer to the axis of the shaft; said rod being translatorily rotatable in a conical path about the fulcrum as an apex on rotation of said shaft, and a sealed bellows between the interior of said closure member and the portion of said rod between the fulcrum and the operating shaft, and a pair of driven members located adjacent the free end of the rod; one of the driven members having an element engaged by the free end of the rod when the free end is displaced further from said axis; the other driven member having an element engaged by the free end of the rod when the free end is displaced closer to said axis.

References Cited in the file of this patent

UNITED STATES PATENTS 2,454,340　　Reichel _____ Nov. 23, 1948